United States Patent
Gordon

[11] 3,774,159
[45] Nov. 20, 1973

[54] APPARATUS AND METHOD FOR DETERMINING THE PROFILE OF AN UNDERWATER TARGET

[75] Inventor: Alan Gordon, San Diego, Calif.

[73] Assignee: The United States of America as represented by the Secretary of the Navy, Washington, D.C.

[22] Filed: Nov. 24, 1972

[21] Appl. No.: 309,581

[52] U.S. Cl. ................................. 340/3 R, 340/5 H
[51] Int. Cl. .............................................. G01s 9/66
[58] Field of Search ..................... 340/1 R, 3 R, 3 F, 340/5 H, 5 MP; 181/0.5 NP

[56] References Cited
UNITED STATES PATENTS
3,719,922 3/1973 Lopes, Jr. et al. ................ 340/5 MP

*Primary Examiner*—Richard A. Farley
*Attorney*—Richard S. Sciascia et al.

[57] ABSTRACT

Apparatus for determining the spatial Fourier transform of an arbitrary pressure field $p(x)$, and therefore the acoustic profile of an underwater target upon which an acoustic signal has been made to impinge, by an analysis of the Fourier transform of the reflected acoustic signal detected at uniformly spaced underwater detecting points located in the analyzing plane. The apparatus comprises a radio-frequency generator, which generates a frequency $\omega_{RF}$, and which has an active and neutral connection. A two-conductor transmission line, having a characteristic impedance of $Z_0$, has one conductor connected to the neutral connection of the r-f generator. An impedance Z, where Z << than the input impedance of the line, has two terminals, one terminal being connected to the active connection of the r-f generator, and the other terminal being connected to the other conductor of the r-f transmission line. A plurality of pressure-sensitive elements, which comprise the uniformly-spaced underwater detecting points for the detection of the reflected acoustic energy, are connected across the two conductors of the transmission line, each element having an admittance equal to Y.

Whereby connecting a voltmeter across the impedance Z to read a voltage $V_Z(\omega)$ and dividing $V_Z(\omega)$ by $\omega_{RF}$ results in obtaining the $\omega_{RF} \sqrt{L_0 C_0}$ component of the Fourier transform of the pressure field $p(x)$, where $L_0$ and $C_0$ are the inductance and capacitance per unit length of the line.

8 Claims, 2 Drawing Figures

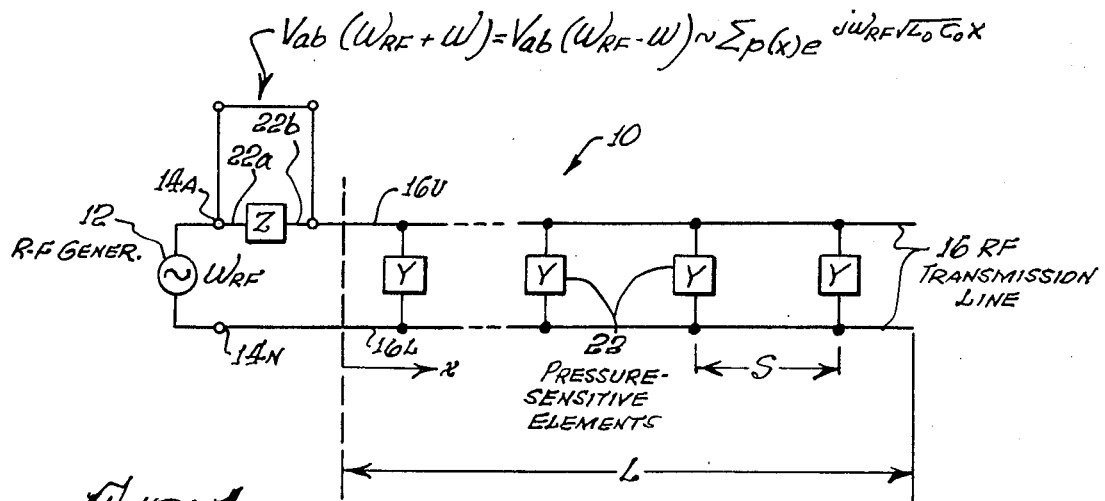
FIG. 1. APPARATUS FOR DETERMINING THE ACOUSTIC PROFILE OF AN UNDERWATER TARGET.
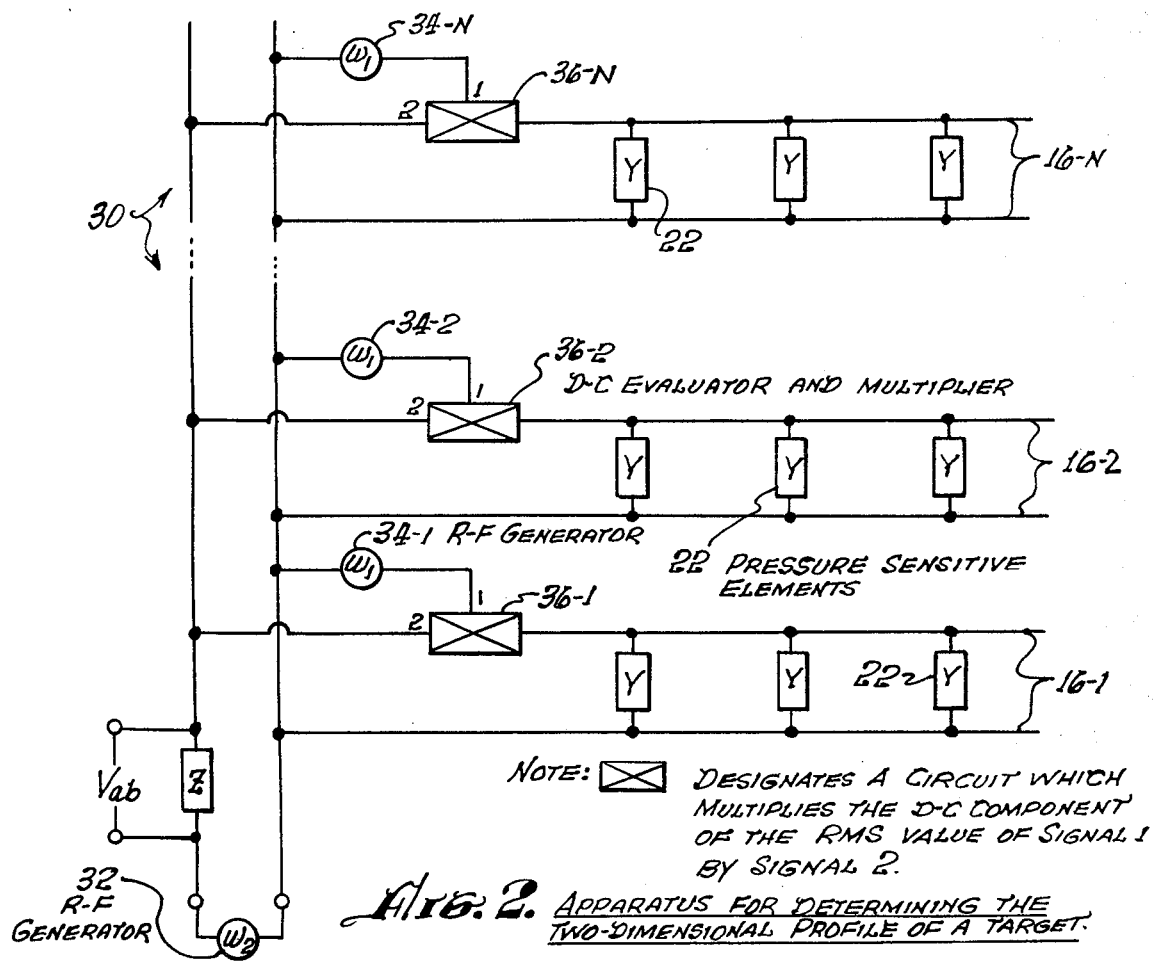
FIG. 2. APPARATUS FOR DETERMINING THE TWO-DIMENSIONAL PROFILE OF A TARGET.

APPARATUS AND METHOD FOR DETERMINING THE PROFILE OF AN UNDERWATER TARGET

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to a device which obtains the spatial Fourier transform of an arbitrary pressure field which varies harmonically in time, but can vary in any manner whatsoever spatially. Involved in the use of the invention is a transducer which projects the sonic waves which are sent out to the target, and then are reflected back towards the projector. The reflected waves are then analyzed. The fact that the waves are varying harmonically in time is no real limitation because that is generally the type of signal which is projected anyway. There are two signals being emitted:

1. An acoustic signal which is projected through the water to the target, is reflected off the target and back to the analyzing plane. The acoustic over-pressure distribution is sensed by the small pressure-sensitive elements, located in the analyzing plane, and which are connected in parallel across the r-f transmission line, also located in the analyzing plane.

2. R-f standing waves are also transmitted along the r-f transmission line. The r-f frequency is designated $\omega_{RF}$.

The receiving elements have an admittance Y. These admittances are strung out on the line, spaced by a distance S. The incoming signal is an over-pressure (over ambient) distribution which the admittances labeled Y sense. The frequency $\omega_{RF}$ is generated along the transmission line which includes the admittances Y. Standing waves are generated along the line.

These standing waves will cause a voltage across each capacitive element Y, depending upon the position along the r-f transmission line at which the admittance element is located. Some admittance elements will be located at the nodes of these voltage standing waves, so therefore no current will appear at those admittance elements. Other elements will be located at the peaks of voltage distribution, and these will cause significant current to pass through the particular admittance elements. Other elements will be located intermediate the nodes and peaks.

The total current flowing through all of the admittance elements is proportional to the Fourier transform of the acoustic pressure field at the transmission line.

Thus the problem of reconstructing the image of the target is equivalent to finding the spatial Fourier transform of the over-pressure distribution.

All acoustic imaging systems use an acoustic source to "illuminate" the region in the source's vicinity. Any object in this region will reflect sound back to the "analyzing plane" where the reflected sound must be analyzed to reconstruct an image of the object. The analyzing plane is the plane in which the array of sensing, or detecting, elements is located.

For objects many wavelengths from the source-receiver combination, the over-pressure distribution in the analyzing plane is merely the Fourier transform of the object. The work "over-pressure" distribution relates to the distribution which is above the ambient distribution.

In the prior art, three basic schemes have been used to evaluate this Fourier transform. The first is the acoustic lens, a device directly analogous to its optical counterpart. Its prominent disadvantages are resolution limited due to shear effects in the lens, little or no control of focus, fragility, and bulkiness.

The other two schemes of reconstructing the image use hydrophone arrays which are expensive and whose preamplifiers must be well matched. In the first of these two methods the output of the hydrophone array is fed into a special-purpose computer which is programmed to take Fourier transforms. These computers are at present large, expensive and require 2-3 seconds to perform the transform. The last method feeds the signal into an optical reconstructor. As yet the available optical reconstructors are of limited life and not rugged. Thus the need for an improved acoustic Fourier transform system is evident. In the last two prior art methods, the analyzing plane is the plane which contains the hydrophone array.

However, it is not necessary to use a hydrophone array. This invention relates to a one-dimensional, or more, Fourier transform wherein a conventional hydrophone array is not used. In this invention sensing elements are used instead of hydrophones, for example, small capacitors whose capacitance varies with the pressure.

The advantages and new features of the present invention are:

a. It dispenses with the need for lenses, computers, matched active hydrophone preamplifiers and optical reconstructors.

b. Its construction is within the realm of present-day technology.

c. The device operates in real time.

d. The output of the device is in the proper form for driving display devices such as a cathode ray tube.

e. The cost of this system is less than alternative methods.

SUMMARY OF THE INVENTION

This invention relates to an apparatus and method for determining the spatial Fourier transform of an arbitrary pressure field $p(x)$, and therefore the acoustic profile of an underwater target upon which an acoustic signal has been made to impinge, by an analysis of the Fourier transform of the reflected acoustic signal detected at uniformly spaced underwater detecting points located in the analyzing plane.

The main elements of the invention comprise:

1. a radio-frequency generator; (2) a two-conductor transmission line having a characteristic impedance of $Z_0$; (3) an impedance Z, where $Z \ll$ than the input impedance of the line; and (4) a plurality of pressure-sensitive capacitors, which comprise the uniformly-spaced underwater detecting points for the detection of the reflected acoustic energy, connected across the two conductors of the transmission line.

OBJECTS OF THE INVENTION

An object of the invention is to provide an apparatus and method which does not require the use of acoustic lenses or matched active hydrophone preamplifiers.

Another object of the invention is to provide an apparatus and method which does not require the use of a computer, but, rather, operates in real time.

Still another object of the invention is to provide an apparatus and method which is fairly simple and economical to implement.

Other objects, advantages and novel features of the invention will become apparent from the ollowing detailed description of the invention, when considered in conjunction with the accompanying drawings, wherein:

BRIEF DESCRIPTION OF THE DRAWING

FIG. 1 is a schematic view of the apparatus for determining the one-dimensional acoustic profile of a target.

FIG. 2 is a schematic view of an apparatus for determining the two-dimensional acoustic profile of a target.

DESCRIPTION OF THE PREFERRED EMBODIMENT

Before discussing in detail the specific construction of the apparatus of the invention, a few general remarks may prove useful.

There is a sound source, and there is an object, or target, somewhere out in space. Sound waves are projected by the sound source, and then reflected back towards the sound source. Assume that the target is spherical in shape. If it turns out that the sphere is far enough away, when the waves come back to the analyzing plane, these waves are distributed in space as the Fourier transform of the sphere. The impinging is with a point source, but there is a volume distribution of the reflected signal. Part of the reflected signal comes in through, or is intercepted by, the receiving element, and that part is part of the Fourier transform. The received signal is part of the Fourier transform, in fact, it is part of a hologram.

Even though it is a point source which sends out the signal, the whole half-sphere is subjected to the signal. The precise form that the reflected signal takes makes it possible to determine that the target was actually circular in shape, and not, for example, a straight line.

If the target were not circular, for example, assume that it were a cube, then the reflected Fourier transform would be different, and it would be possible to determine that the target had straight line elements, rather than having circular lines.

If the projector, the sensing elements, and the sphere wall are all in the same plane, then the received signal would be a line through the diameter of the sphere. If the sphere were a little below the plane, the received signal would be from a part near the top, and if it were above the plane, one would get a signal near the bottom.

The signal reflected from a sphere would tend to be a point, whereas the signal reflected from a cube would tend to be a line. Because of the specularity involved, the reflected signal is not nearly as clear as it would be in an optical system.

A signal received from a submarine might appear on the display device, such as a scope, as merely two lines, one for the conning tower, and one for the hull. This will happen because of the property of the acoustic imaging.

For use of the apparatus with a CRT display tube; the horizontal plates would be driven proportional to $\omega_{RF}$, while the vertical plates are connected across the impedance Z.

Referring now to FIG. 1, therein is shown an apparatus 10 for determining the spatial Fourier transform of an arbitrary pressure field $p(x)$, and therefore the acoustic profile of an underwater target upon which an acoustic signal hass been made to impinge, by an analysis of the Fourier transform of the reflected acoustic signal detected at uniformly spaced underwater detecting points located in the analyzing plane.

The apparatus 10 includes a radio-frequency generator 12, which generates a frequency $\omega_{RF}$ and which has an active and a neutral connection, 14A and 14N.

A two-conductor transmission line 16 has a characteristic impedance of $Z_0$, one conductor 16L of the line being connected to the neutral connection 14N of the r-f generator 12.

An impedance Z, designated 18, where Z << than the input impedance of the line 16, has two terminals, one terminal 22a being connected to the active connection 14A of the r-f generator 12, the other terminal 22b being connected to the other conductor 16U of the r-f transmission line.

A plurality of pressure-sensitive elements 22, which comprise the uniformly-spaced underwater detecting points for the detection of the reflected acoustic energy, are connected across the two conductors 16U and 16L, of the transmission line 16, each element having an admittance equal to Y.

Whereby connecting a voltmeter across the impedance Z to read a voltage $V_Z(\omega)$, or $V_{ab}(\omega)$, and dividing $V_Z(\omega)$ by the frequency $\omega_{RF}$ results in obtaining the $\omega_{RF}\sqrt{L_0C_0}$ component of the Fourier transform of the pressure field $p(x)$, where $L_0$ and $C_0$ are the inductance and capacitance per unit length of the line.

Discussing now in more detail the main elements and parameters of the invention, the acoustic pinging frequency would depend on the distance to the target, but is, typically, in the range of 10 kHz.

A reasonable range of frequencies $\omega_{RF}$ for a coaxial cable would be about 5 to 200MHz, corresponding to wavelengths of 1.5m to 60m. The value of the frequency $\omega_{RF}$ is restricted by two considerations: (1) if the value of the frequency $\omega_{RF}$ is too high, there is too much attenuation for a given length L of transmission line; and, (2) if the value of the frequency $\omega_{RF}$ is too low, then the length of the line L has too be too great.

The steps to be followed are the following: A value of the frequency $\omega_{RF}$ at the lower end of the prescribed range is chosen. The magnitude of the current across the impedance Z is read. This gives one of the Fourier components. The frequency of $\omega_{RF}$ is gradually increased, and successive readings of the current across the impedance Z give other points or values of the Fourier transform. Since only the current intensity is of interest only the magnitude of the current, and not its phase, is of importance, and only the magnitude need be determined or read.

The spacing S between the uniformly-spaced detecting points 22 determines the field of view and no be not smaller than half the wavelength of the highest frequency used.

Discussing now the mathematical theory of the invention, this invention makes use of a length, L, of transmission line 16 of characteristic impedance $Z_0$, to which reactive elements 22 are connected in parallel at equally spaced intervals S along the line (see FIG. 1). Considering the line 16 as ideal and by placing a radio-frequency generator 12 of frequency $\omega_{RF}$ at one end of the line, and leaving the other end open, before any reactive elements Y are placed across the line, standing voltage waves will be present along the line given by the relation $$V(x) = Ae^{j\omega_{RF}\sqrt{L_0 C_0}x} \frac{1}{2}\{(e^{j\omega_{RF}t} + e^{-j\omega_{RF}t})\} \quad (1)$$

where $A$ is the amplitude of the voltage, $x$ is the distance along the line measured from the voltage source 12, and $L_o$ and $C_o$ are respectively the inductance and capacitance per unit length of the line. Now elements of admittance $Y$ are placed at equally spaced intervals $S$ along the line 16, where $Y$ is given by $$Y = J\omega_{RF} C(1 + K\Delta p) \quad (2)$$

where $C$ and $K$ are constants and $\Delta p$ is the over-pressure. An example of such an element $Y$ is a parallel plate capacitor whose plates are free to move and which are separated by a compressible dielectric. For small motions of the plates, such a capacitor obeys equation (2), with $K$ being proportional to the dielectric's compressibility.

The insertion of the admittances $Y$ at equally spaced intervals $S$ along the line 16 will in general alter the voltage distribution from that given by equation (1). However if certain operating conditions are met, equation (1) will still be valid. These conditions are $\omega_{RF} \sqrt{L_o C_o} S << 1$, $C \leq C_o S$ and $K\Delta p \leq 1$
$\Delta p$, the over-pressure in equation (2) is given by
$$\Delta p = p(x)e^{j\omega t} \quad (3)$$

where $\omega$ is the acoustic insonification frequency and $t$ is the time.

In equation (3), since $\Delta p$ is a function of $x$, the pressure at an admittance element $Y$ would vary according to $x$. The distance $x$ is sensed at the admittance elements $Y$ only at discrete points, although there is also an over-pressure distribution between any two discrete points.

By substituting equation (3) into equation (2) and multiplying the resulting expression for the admittance by equation (1), the current $I(x)$ through an element located at $x$ is seen to be $$I(x) = \{j A\omega_{RF} C e^{j\omega_{RF}\sqrt{L_0 C_0}x}$$
$$+ j A\omega_{RF} CK e^{j\omega t} p(x) e^{j\omega_{RF}\sqrt{L_0 C_0}x}\} \{\frac{1}{2}(e^{j\omega_{RF}t} + e^{-j\omega_{RF}t})\} \quad (4)$$

An impedance Z can be inserted in series with the line at the generator end without invalidating any of the above argument, providing only that $Z <<$ than the input impedance of the line. Doing this (see FIG. 1), the total current is $I_z = \Sigma I(x) + Y_t \int V(x)dx$ where $Y_t$ is the continuous admittance per unit length of the transmission line 16 and the sum is performed over the lumped admittance elements. Summing and integrating equation (4), the following is obtained:

$$I_z = \{j A\omega_{RF} C \Sigma e^{j\omega_{RF}\sqrt{L_0 C_0}x}$$
$$+ Y_1 A \frac{e^{j\omega_{RF}\sqrt{L_0 C_0}L} - 1}{j\omega_{RF}\sqrt{L_0 C_0}}\} \{\frac{1}{2}(e^{j\omega_{RF}t} + e^{-j\omega_{RF}t})\}$$
$$+ j A\omega_{RF} CK \Sigma p(x) e^{j\omega_{RF}\sqrt{L_0 C_0}x} \left(\frac{e^{j(\omega + \omega_{RF})t}}{2}\right)$$
$$+ j A\omega_{RF} CK \Sigma p(x) e^{j\omega_{RF}\sqrt{L_0 C_0}x} \left(\frac{e^{-j(\omega_{RF} - \omega)t}}{2}\right) \quad (5)$$

It should be noted that the first four terms in equation (5) represent a current at the frequency of $\omega_{RF}$ while the last two terms represent currents at the frequencies $\omega_{RF} + \omega$ and $\omega_{RF} - \omega$ respectively. By measuring either the voltage component of frequency $\omega_{RF} + \omega$, namely $V_z(\omega_{RF} + \omega)$, or the voltage component of frequency $\omega_{RF} - \omega$, namely $V_z(\omega_{RF} + \omega)$, across the impedance Z we have
$$V_z(\omega_{RF} + \omega)/\omega_{RF} = V_z(\omega_{RF} - \omega)/\omega_{RF} = j(\frac{1}{2})ZACK \Sigma p(x)e^{j\omega_{RF}\sqrt{L_0 C_0}x} \quad (6)$$

The right hand side is proportional to the $\omega_{RF} \sqrt{L_0 C_0}$ component of the Fourier transform of $p(x)$. Thus the $\omega_{RF} \sqrt{L_0 C_0}$ component is obtainable by the simple process of setting the RF frequency to $\omega_{RF}$, measuring the voltage across Z and dividing by the frequency $\omega_{RF}$. All the components $\omega_{RF} \sqrt{L_0 C_0}$ are obtainable by stepping through various values of $\omega_{RF}$. Both the dividing out of $\omega_{RF}$ and the changing of $\omega_{RF}$ are accomplishable with present-day electronic techniques.

The invention as described heretofore and as illustrated in FIG. 1 relates to a one-dimensional Fourier transform. For a two-dimensional transform, two or more transmission lines would have to be placed in parallel.

Accordingly, as shown in FIG. 2, to determine the two-dimensional spatial Fourier transform of an arbitrary pressure field $p(x)$, and therefore the two-dimensional acoustic profile of an underwater target upon which an acoustic signal has been made to impinge, the apparatus 30 comprises a plurality of two-conductor transmission lines 16-1 through 16-N, each substantially like, parallel to, and connectedd in a similar manner to, the first-named transmission line 16, shown in FIG. 1. A plurality of sets of pressure sensitive elements 22 are required, each set of elements being connected across each additional conductor transmission line, 16-1 through 16-N. The totality of sensing elements 22 thereby determine a plane which corresponds to the acoustic pressure field.

The radio-frequency generator 12, having a frequency $\omega_{RF}$, of FIG. 1, has been replaced by the r-f generator 32, operating at a frequency $\omega_2$. In addition, to obtain a two-dimensional profile, additional r-f generators, labeled by reference numerals 34-1 through 34-N, are required.

The two frequencies $\omega_1$ and $\omega_2$, and the acoustic frequencies generated across the transmission lines, 16-1 through 16-N, are processed in the rectangular boxes labeled by reference numerals 36-1 through 36-N. Each of these boxes designate a circuit which determines the d-c component of the rms value of the signal labeled 1, generated by frequency generators 34-1 through 34-N, having a frequency of $\omega_1$, and then muliplies the d-c component by the signal labeled 2, generated by r-f generator 32. Since circuits for determining rms values of signals are old in the art, in fact, many voltmeters, or ammeters, measure rms values, and it is also old in the art to determine the d-c components of any signal, even very complex signals, the d-c evaluator function of d-c evaluator and multiplier 36 need not be further elaborated upon. Multipliers are also old in the art.

$V_{ab}$, the voltage across impedance Z, will then be proportional to a component of the two-dimensional Fourier transform of the pressure field.

Discussing now the specific construction of the various components of the invention, the sensing elements, 22, in the form of capacitors, could be of various metals, but in some cases the metals may have to be enclosed in a potting compound, to prevent them fron conducting current through the water. The plates of the admittance elements could be aluminum, and would have a size in the range of one inch to one foot.

The compressible dielectric could be an oil.

By using a specially constructed pressure-sensitive line it would be possible to do away with the lumped parameters altogether. A specially constructed pressure-sensitive line might take the form of a line having an outer insulator, two spaced-apart conductors within the insulator, and a compressible dielectric within the cavity formed by the outer insulator. It would be so constructed that the two conductors are fairly close together, so that the entire line is sensitive to the overpressure. The two conductors, while separated in space, would move closer or further away depending on the pressure distribution along the line.

Other possible alternatives or modifications of the apparatus are:

a. Replacing the capacitive admittances in parallel with pressure-sensitive inductors in series, or some other pressure-sensitive reactance.

b. In a more sophisticated embodiment where the current through the admittance elements is very small, it is possible to use active elements to amplify the current in each admittance element to obtain greater reliability. Each admittance element, therefore, besides including a capacitor would also include a current amplifier, for example, in the same line.

c. Microwave guides and microwaves might be used instead to give low loss.

Obviously many other modifications and variations of the present invention are possible in the light of the above teachings. It is therefore to be understood that within the scope of the appended claims the invention may be practiced otherwise than as specifically described.

What is claimed is:

1. Apparatus for determining the spatial Fourier transform of an arbitrary pressure field $p(x)$, and therefore the acoustic profile of an underwater target upon which an acoustic signal has been made to impinge, by an analysis of the Fourier transform of the reflected acoustic signal detected at uniformly spaced underwater detecting points located in the analyzing plane, comprising:

a radio-frequency generator, which generates a frequency $\omega_{RF}$, and which has an active and a neutral connection;

a two-conductor radio-frequency transmission line, extended in a straight line, having a characteristic impedance of $Z_0$, one conductor of which is connected to the neutral connection of the r-f generator;

an impedance Z, where Z << than the input impedance of the line, the impedance having two terminals, one terminal being connected to the active connection of the r-f generator.

the other terminal being connected to the other conductor of the r-f transmission line;

a plurality of pressure-sensitive elements, which comprise the uniformly-spaced underwater detecting points for the detection of the reflected acoustic energy, connected across the two-conductors of the transmission line, each element having an admittance equal to Y;

whereby connecting a voltmeter across the impedance Z to read a voltage $V_Z(\omega)$ and dividing $V_Z(\omega)$ by the frequency $\omega_{RF}$ results in obtaining the $\omega_{RF} \sqrt{L_0 C_0}$ component of the Fourier transform of the pressure field $p(x)$, where $L_0$ and $C_0$ are the inductance and capacitance per unit length of the transmission line.

2. Apparatus according to claim 1, wherein the two-conductor transmission line is a coaxial cable.

3. Apparatus according to claim 1, wherein the two-conductor transmission line is a two-conductor twin lead.

4. Apparatus according to claim 2, wherein the pressure-sensitive elements are pressure-sensitive capacitors.

5. Apparatus according to claim 1, wherein the pressure-sensitive elements are pressure-sensitive inductors.

6. The apparatus according to claim 1, further comprising:

a plurality of two-conductor transmission lines, each substantially like, parallel to, and connected in a similar manner to, the first-named transmission line;

at least one additional plurality of pressure-sensitive elements, each plurality of elements connected across each additional two-conductor transmission line;

the totality of sensing elements determining a plane which corresponds to the acoustic pressure field.

7. The apparatus according to claim 6, wherein the totality of sensing elements forms a rectangular matrix of sensing elements.

8. A method for determining the spatial Fourier transform of an arbitrary pressure field $p(x)$, and therefor the acoustic profile of an underwater target upon which an acoustic signal has been made to impinge, by an analysis of the Fourier transform of the reflected acoustic signal detected at uniformly-spaced underwater detecting points located in the analyzing plane, comprising the following steps:

1. connecting one conductor of a two-conductor transmission line having a characteristic impedance of $Z_0$ to one end of an impedance Z << the input impedance of the line;

2. connecting a radio-frequency generator, generating a frequency $\omega_{rf}$, to the other conductor of the transmission line and to the other end of the impedance Z;

3. connecting a plurality of pressure-sensitive elements, which comprise the uniformly-spaced underwater detecting points for the detection of the reflected acoustic energy, to and across the two conductors of the transmission line, each elements having an admittance equal to $Y$; and 4. connecting a voltmeter across the impedance Z, to read a voltage $V_Z(\omega)$; and 5. dividing $V_Z(\omega)$ by $\omega_{RF} \sqrt{L_0 C_0}$ to obtain the $\omega_{RF}$ component of the Fourier transform of the pressure field $p(x)$, where $L_0$ and $C_0$ are the inductance and capacitance per unit length of the transmission line.

* * * * *